United States Patent Office 3,825,507
Patented July 23, 1974

3,825,507
LEUCAURAMINE DERIVATIVES
Violet Boyd, Ronald Arthur Evans, Kenneth Anthony Holt, and Andrew Hunter Morris Renfrew, Manchester, England, assignors to Imperial Chemical Industries Limited, London, England
No Drawing. Filed Sept. 1, 1971, Ser. No. 177,109
Claims priority, application Great Britain, Sept. 4, 1970, 42,533/70; Dec. 16, 1970, 59,715/70; July 26, 1971, 34,955/71
Int. Cl. C07c 101/42
U.S. Cl. 260—518 R                  1 Claim

ABSTRACT OF THE DISCLOSURE

A leucauramine compound of the general formula:

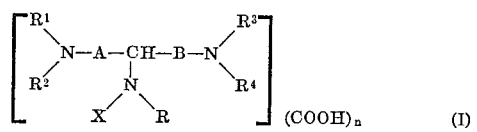

wherein A and B each independently represents an optionally substituted 1,4-arylene residue; R represents hydrogen, hydroxyl, alkoxy or an optionally substituted amino, alkyl, aralkyl or cycloalkyl radical; X represents hydrogen or an optionally substituted hydrocarbon radical which may contain one or more hetero atoms, or R and X together with the attached nitrogen atom form an optionally substituted heterocyclic ring; each of $R^1$, $R^2$, $R^3$ and $R^4$ independently represents hydrogen or an optionally substituted alkyl, aralkyl, cycloalkyl or aryl radical or forms part of a divalent organic chain which together with the attached nitrogen atom constitutes a heterocyclic ring and $n$ has a value of 1, 2 or 3 provided that when R is hydrogen and each of

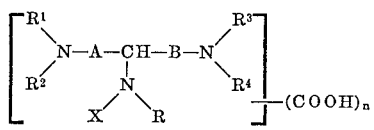

is 4-dimethylaminophenyl, X is not 2- or 4-carboxyphenyl.

The compounds are suitable for use in the production of clean-to-handle carbon papers useful in a spirit-reproducing process.

---

This invention relates to leucauramine derivatives of value in impact-printing systems using colourless carbon paper, spirit duplicating carbons and the like.

According to the invention, there are provided leucauramine compounds of the general formula:

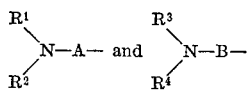 (COOH)$_n$  (I)

wherein A and B each independently represents an optionally substituted 1,4-arylene residue; R represents hydrogen, hydroxyl, alkoxy or an optionally substituted amino, alkyl, aralkyl or cycloalkyl radical; X represents hydrogen or an optionally substituted hydrocarbon radical which may contain one or more hetero atoms, or R and X together with the attached nitrogen atom form an optionally substituted heterocyclic ring; each of $R^1$, $R^2$, $R^3$ and $R^4$ independently represents hydrogen or an optionally substituted alkyl, aralkyl, cycloalkyl or aryl radical or forms part of a divalent organic chain which together with the attached nitrogen atom constitutes a heterocyclic ring and $n$ has a value of 1, 2 or 3 provided that when R is hydrogen and each of

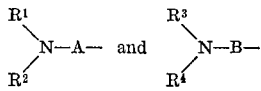

is 4-dimethylaminophenyl, X is not 2- or 4-carboxyphenyl.

Each of the carboxyl groups indicated in Formula I may be attached to residue A or B or to any of the radicals represented by R, $R^1$, $R^2$, $R^3$ and $R^4$ but is preferably attached to an optionally substituted hydrocarbon radical represented by X. In addition to containing from 1 to 3 carboxyl groups, the compounds of Formula I may contain one or more other acid radicals, for example sulpho or sulphato radicals. Thus, X may be a phenyl radical carrying a carboxyl and a sulpho group.

Examples of 1,4-arylene residues which may be represented by A and B include particularly 1,4-phenylene but also 1,4-naphthylene residues. As examples of substituents which may be present on said arylene residues there may be mentioned halogen atoms and optionally substituted alkyl or alkoxy groups. It is preferred that no substituents are present on A and B but when substituents are present they are preferably alkyl radicals.

Hydrocarbon radicals which may be represented by X include aryl, for example phenyl and naphthyl, alkyl, for example methyl and ethyl, and various alkyl aryl combinations for example benzyl. Hydrocarbon radicals containing hetero atoms include pyridyl and quinolyl. X is preferably aryl.

As examples of optionally substituted alkyl radicals which may be represented by R, $R^1$, $R^2$, $R^3$, and $R^4$ there may be mentioned optionally substituted lower alkyl radicals for example, ethyl, propyl, butyl, β-hydroxyethyl, β-chloroethyl, β-pyridin-1-ylethyl and, particularly methyl.

As examples of optionally substituted aralkyl radicals which may be represented by R, $R^1$, $R^2$, $R^3$ and $R^4$ there may be mentioned 4-methoxybenzyl, 2-methylbenzyl and, particularly, benzyl.

As examples of optionally substituted cycloalkyl radicals which may be represented by R, $R^1$, $R^2$, $R^3$ and $R^4$ there may be mentioned 2-methylcyclohexyl, 4-methylcyclohexyl, cyclopentyl and, particularly, cyclohexyl.

As examples of optionally substituted aryl radicals which may be represented by $R^1$, $R^2$, $R^3$ and $R^4$ there may be mentioned 2-methylphenyl, 4-methylphenyl, 3-chlorophenyl, naphth-2-yl, and, particularly, phenyl.

As examples of optionally substituted amino groups which may be represented by R there may be mentioned dialkylamino groups such as dimethylamino and diethylamino and as examples of alkoxy groups there may be mentioned methoxy and ethoxy.

When either of $R^1$ and $R^2$ forms part of a divalent organic chain which together with the attached nitrogen atom constitutes a heterocyclic ring, this may be because $R^1$ and $R^2$ are joined together or because at least one of $R^1$ and $R^2$ is attached to arylene residue A. The radicals $R^3$ and $R^4$ may in the same way form parts of heterocyclic rings.

As examples of heterocycle rings which may be formed by $R^1$ and $R^2$ or $R^3$ and $R^4$ being joined together there may be mentioned 5- or 6-membered rings such as piperidine, N-methylpiperazine and morpholine rings. As examples of heterocyclic rings which may be formed by $R^1$ and/or $R^2$ being attached to arylene residue A, or $R^3$ and/or $R^4$ being attached to arylene residue B, there may be mentioned julolidin-8-yl, N-methyltetrahydroquinolin-6-yl and 1,2-dimethylindolin-5-yl.

Preferably, R is a hydrogen atom or alkyl radical or, together with X and the nitrogen atom forms a heterocyclic ring. As examples of heterocyclic rings which may be represented by R and X together with the nitrogen atom there may be mentioned 5- or 6-membered rings such as pyrrolidine, piperidine and morpholine.

Preferably $R^1$, $R^2$, $R^3$ and $R^4$ are optionally substituted alkyl radicals, particularly unsubstituted alkyl radicals such as methyl or ethyl, or $R^1$ and $R^2$ together and $R^3$ and $R^4$ together form divalent organic chains, preferably hydrocarbon chains.

It is preferred that $n$ has a value of 1.

The leucauramine derivatives of the invention are particularly suitable for use in the preparation of clean-to-handle carbon papers for spirit-reproducting copying processes when used in the form of their Group IA metal, Group IIA metal, optionally substituted ammonium, optionally substituted hydrazine, optionally substituted hydroxylamine, optionally substituted guanidine or heterocyclic base salts. In the salts, the amount of the aforesaid metals and nitrogenous bases is equivalent to at least one of the carboxyl groups. Particularly useful Group IA metals includes sodium, potassium and lithium. Particularly useful Group IIA metals are magnesium and calcium. The substituted ammonium salts may be primary, secondary or tertiary amine salts or quaternary ammonium salts.

In general, the preferred salts are the alkali metal, optionally substituted ammonium, optionally substituted hydrazine, optionally substituted hydroxylamine, optionally substituted guanidine or heterocyclic base salts and, of these, the alkali metal and optionally substituted ammonium salts are favoured, especially the substituted ammonium salts.

Within the class of leucauramine derivatives represented by Formula I, particular mention may be made of the alkali metal, alkaline earth metal, ammonium, substituted ammonium, optionally substituted hydrazine, optionally substituted hydroxylamine, optionally substituted guanidine or heterocyclic base salts in which R is hydrogen, hydroxyl, an optionally substituted amino, alkyl, aralkyl, or cycloalkyl radical or an alkylene chain which together with the attached nitrogen atom and X form a heterocyclic ring; X is an optionally substituted hydrocarbon radical which may contain one or more hetero atoms; each of $R^1$, $R^2$, $R^3$ and $R^4$ independently is an optionally substituted alkyl, aralkyl, cycloalkyl or aryl radical or forms part of a hydrocarbon chain which together with the attached nitrogen atom constitutes a heterocyclic ring and each carboxyl group is attached to X.

Mention may also be made of the alkali metal, ammonium and substituted ammonium salts of leucauramine derivatives of Formula I wherein each of A and B is a 1,4-phenylene residue optionally substituted by one or more alkyl groups, R is hydrogen or alkyl, X is a divalent organic radical, each of $R^1$, $R^2$, $R^3$ and $R^4$, which may be the same or different, is an alkyl group and the single carboxyl group is attached to X.

The leucauramine derivatives of Formula I may be prepared by reacting a compound having the general formula:

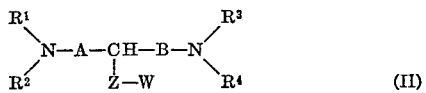

(II)

wherein A, B, $R^1$, $R^2$, $R^3$ and $R^4$ have the meanings already stated, Z represents sulphur, or, preferably, oxygen and W represents alkyl or, preferably, hydrogen with an amine of the formula:

X—NHR     (III)

wherein X and R have the meanings already stated, the compound and the amine together containing $n$ carboxyl groups wherein $n$ has the meaning already stated, provided that when each of

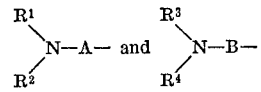

is 4-dimethylaminophenyl, the amine of Formula III is not anthranilic acid or p-aminobenzoic acid.

Thus, leucauramine compounds falling within the scope of Formula I may be prepared by reacting a compound of the formula:

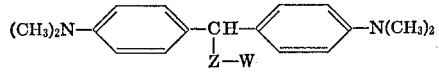

wherein Z and W have the meanings already stated, with an amine of Formula III which contains $n$ carboxyl groups, provided that when X is 2- or 4-carboxyphenyl, R is hydroxyl, alkoxy or an optionally substituted amino, alkyl, aralkyl or cycloalkyl radical.

Other leucauramine compounds within the scope of Formula I may be prepared by reacting an amine of Formula III with a compound of Formula II in which at least one of $R^1$, $R^2$, $R^3$ and $R^4$ is not methyl when each of A and B is an unsubstituted 1,4-phenylene radical.

The leucauramine derivatives so prepared may be converted into their Group IA metal, Group IIA metal, optionally substituted ammonium, optionally substituted hydrazine, optionally substituted hydroxylamine, optionally substituted guanidine or heterocyclic base salts, if desired, by treatment with the appropriate agent, for example a Group IA metal hydroxide, alkoxide, carbonate or bicarbonate, a Group IIA hydroxide or an appropriate nitrogenous base. Alternatively, the salts may be prepared directly by starting from a compound of Formula II and/ or an amine of Formula III already in salt form.

Examples of compounds of Formula III includes anthranilic acid, p-aminobenzoic acid, m-aminobenzoic acid, 3-aminophthalic acid, 4-aminophthalic acid, 3-aminonicotinic acid, 3-amino-1,2,4-triazole-5-carboxylic acid, gylcine, 2-amino-4-sulphobenzoic acid and their salts.

Examples of compounds of Formula II include Michler's Hydrol, bis-(4-diethylaminophenyl methanol, bis(2-methoxy-4-dimethylaminophenyl)methanol, bis(4-piperidinophenyl methanol, bis(2 - methyl - 4-dimethylaminophenyl)methanol and bis(N-methyl-6-tetrahydroquinolinyl)methanol.

The process of making the leucauramine derivatives is conveniently carried out in a solvent such as water, alcohols or toluene. Suitable temperatures for the process are from 0° C. to 150° C., preferably from 20° C. to 100° C.

Leucauramine compounds of Formula I may also be prepared by reducing a compound of the formula:

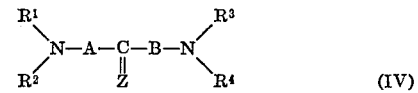

(IV)

wherein A, B, $R^1$, $R^2$, $R^3$, $R^4$ and Z have the meanings already stated, using neutral or alkaline conditions and reacting the product, without isolation, with an amine of Formula III, the compound and the amine together containing $n$ carboxyl groups wherein $n$ has the meaning already stated, provided that when each of

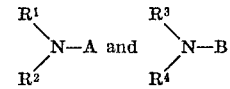

is 4-dimethylaminophenyl, the amine is not anthranilic acid or p-aminobenzoic acid.

Suitable compounds of Formula IV include Michler's Ketone and derivatives thereof.

Leucauramine compounds of Formula I in which R is hydrogen may also be prepared by reducing an auramine derivative of the formula:

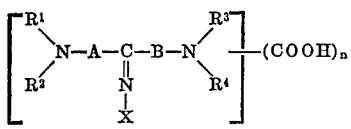

wherein A, B, $R^1$, $R^2$, $R^3$, $R^4$, X, Y and $n$ have the meanings already stated, using neutral or alkaline conditions, provided that when each of

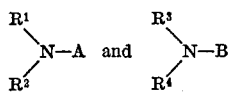

is dimethylaminophenyl, X is not 2- or 4-carboxyphenyl.

The leucauramine derivatives of Formula I singly or as mixtures and preferably in the form of their aforesaid salts are particularly suitable for use in the production of carbon papers of the clean-to-handle type.

Carbon papers of the clean-to-handle type for use in the so-called hectographic or spirit-reproducing copying process consisting of tissue or other suitable film or sheet material on which is a coating containing a colourless derivatives of a basic dyestuff such as Crystal Violet Lactone have already been proposed. In the copying process the carbon paper is placed with its coated surface against one surface of a master paper which is then typed, written or marked on causing transfer of the coating as a substantially colourless reverse image to the first mentioned surface of the master paper at the points where carbon and master papers have been pressed together. The master paper is then brought into contact with a succession of sheets of paper moistened with a suitable spirit-reproducing fluid such as ethanol. The fluid dissolves a part of the basic dyestuff derivative and transfers it to each paper sheet where it combines with an activating substance such as an acid to give a visible colour which will reproduce the original typing or writing on the master paper.

Colour formers hitherto proposed in this process have the disadvantage that they tend to give sticky coatings which are not easy to apply satisfactorily to the tissue or other film or sheet material and may give rise to unclear copies or copies having poor fastness to light. These disadvantages are decreased by the use of the leucauramine compounds of the present invention. The said compounds may be included in coating compositions which may be applied by conventional means to a support material to produce the said clean-to-handle carbon papers.

The invention is illustrated but not limited by the following Examples in which all parts and percentages are by weight.

EXAMPLE 1

To 42 parts of Michler's Hydrol (65% paste) in 200 parts of acetone are added 13.7 parts of m-aminobenzoic acid and the mixture heated under reflux, with stirring for 2 hours. The grey solid which results is filtered off and dried to give 30 parts of N-(m-carboxyphenyl)leucauramine. The sodium salt is prepared by adding the product to a solution of one equivalent of sodium methoxide in methanol and distilling to dryness.

EXAMPLE 2

To 42 parts of Michler's Hydrol (65% paste) in 150 parts of acetone are added 16.5 parts of 2-aminoterephthalic acid and the mixture heated under reflux with stirring for 2 hours. The solution is chilled in ice and the blue solid which results is isolated by filtration to give N-(3,4-dicarboxyphenyl)leucauramine.

The ammonium salt is prepared by adding the product to concentrated ammonia (S.G. 0.88) with stirring and isolating the off white solid which is precipitated.

EXAMPLE 3

To 4.95 parts of bis-(diethylaminophenylmethanol (66% paste) in 60 parts of ethanol are added 1.37 parts of anthranilic acid and the reaction mixture heated under reflux for 1 hour. On cooling, a solid separates and is collected by filtration and suction dried to give 3.2 parts of bis-(diethylaminophenyl) methane-α-anilino - o - carboxylic acid. The potassium salt is prepared by dissolving the free acid in potassium-t-butoxide and crystallising out.

EXAMPLE 4

13.4 Parts of Michler's Ketone, 5 parts of phosphorus oxychloride and 60 parts of propylene dichloride are heated to 65° C., with stirring for 2 hours, then cooled to room temperature. The blue solid which separates is filtered off and washed with 20 parts of ether.

The blue solid is added rapidly to a solution of 15.9 parts of sodium-m-aminobenzoate in 150 parts of water and 150 parts of isopropanol, and is stirred rapidly at room temperature for 10 minutes. The deep orange solution is poured into an excess of ice cold 4N caustic soda solution and the white precipitate is collected by filtration. The solid is dissolved in 100 parts of water and 100 parts of ethanol containing 1 part of sodium hydroxide and hydrogenated over palladised charcoal until one equivalent of hydrogen has been absorbed. The catalyst is removed by filtration, the solvent reduced to half bulk by distillation and the solution chilled in ice to yield 2 parts of sodium-m-carboxyphenyl leucauramine.

EXAMPLE 5

41.5 Parts of Michler's Hydrol (65% paste), 9.3 parts of ethyl glycinate and 150 parts of ethanol are stirred and heated to 50° C. for 4 hours. The solvent is removed by distillation and the residual gum separated on an alumina column with ether as eluent. The main fraction is collected and stirred with sodium hydroxide solution to give 5.8 parts of sodium-carboxymethyl leucauramine.

EXAMPLE 6

32 Parts of Michler's Ketone, 17.1 parts of potassium hydroxide and 200 parts of ethanol are heated under reflux with stirring and 20 parts of zinc dust are added. After 16 hours the suspension is cooled and the zinc residues are filtered off. Concentrated hydrochloric acid is then added to the filtrates until a pH of 6 is given. 21 parts of sodium-4-amino-phenylacetic acid is added and the resultant solution refluxed with stirring for 4 hours. Cooling overnight gave a grey solid which is isolated by filtration and oven dried to yield 28 parts of bis-(p-dimethylaminophenyl)methane-α-anilino-p-sodium methylcarboxylate.

EXAMPLE 7

8.67 Parts of Michler's Hydrol (62.3% paste), 4.16 parts of concentrated hydrochloric acid (35.5%) and 100 parts of water are stirred at room temperature for ¼ hour. 7.65 Parts of 2-carboxysulphanilic acid (89% paste) dissolved in 72 parts of water and sufficient caustic soda solution to give a pH of 7 are added and the greenish suspension is stirred for 3 hours. Caustic liquor is added dropwise until a pH of 10 is achieved, the solution filtered through celite and 20 parts of salt added to the filtrate. The solution is stirred for 2 hours during which time the product precipitates. The solid is isolated by filtration and oven dried to give 10 parts of crude disodium-o-carboxy-p-sulphophenyl leucauramine.

EXAMPLE 8

43.5 Parts of Michler's Hydrol (62.3% paste), 15.7 parts of 5-methoxy anthranilic acid and 150 parts of toluene are heated under reflux, with stirring for 2 hours then cooled. The solid which separates is collected and air dried to give 25 parts of N-(2-carboxy-4-methoxyphenyl)leucauramine.

The leucauramine derivatives prepared as described in Examples 1–8 may be applied in the form of coating compositions to support materials to form clean-to-handle carbon papers useful in a spirit-duplicating process.

The following table gives further Examples of leucauramine compounds of Formula I which are prepared in accordance with the general methods described. For convenience, the radical X is indicated in the Table with the carboxy groups attached thereto except in Examples 17, 21, 22 and 29 where the carboxy groups are attached in other positions. The compounds may be used in the preparation of clean-to-handle carbon papers.

We claim:
1. A leucauramine derivative of the formula:

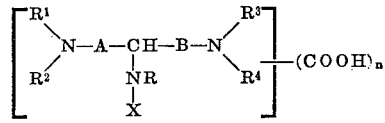

wherein A and B are both 1,4-phenylene, X is m-carboxyphenyl, R is hydrogen, $R^1$–$R^4$ are methyl and $n$ is one.

| Example number | $R^1$ and $R^3$ | $R^2$ and $R^4$ | A and B | R | X | Cation | Reaction solvent |
|---|---|---|---|---|---|---|---|
| 9 | Methyl | Methyl | 1,4-phenylene | Hydrogen | m-Carboxyphenyl | Ammonium | Acetone. |
| 10 | do | do | do | do | do | Potassium | Do. |
| 11 | do | do | do | do | do | Triethylammonium | Toluene. |
| 12 | Hydrogen | do | do | do | o-Carboxyphenyl | Calcium | Ethanol. |
| 13 | β-chloroethyl | do | do | do | do | Sodium | Do. |
| 14 | Morpholino | Morpholino | do | do | do | Hydrogen | Do. |
| 15 | Phenyl | Methyl | do | Methyl | p-Carboxyphenyl | Diethylamine | Toluene. |
| 16 | Methyl | do | do | Hydrogen | 3-Carboxy-4-hydroxyphenyl | Disodium | Ethanol. |
| 17 | do | do | 2-carboxy-1,4-phenylene | Morpholino | | Dilithium | Do. |
| 18 | do | do | do | Hydrogen | o-Carboxyphenyl | Trisodium | Acetone. |
| 19 | Ethyl | Ethyl | 1,4-phenylene | Cyclohexyl | p-Carboxyphenyl | Trimethylammonium | Toluene. |
| 20 | Benzyl | Methyl | do | Hydrogen | 3-carboxy-4-acetamidophenyl | Tetramethylhydrazinium | Do. |
| 21 | Methyl | do | 2-carboxy-1,4-phenylene | Hydroxy | Hydrogen | Disodium | Ethanol. |
| 22 | do | do | do | Dimethylamino | do | do | Do. |
| 23 | 4-methylphenyl | do | 1,4-phenylene | Hydrogen | o-Carboxyphenyl | di-o-Tolylguanidinium | Toluene. |
| 24 | Cyclohexyl | do | do | do | do | N-methylpiperidinium | Do. |
| 25 | β-hydroxyethyl | do | do | do | do | Hydrogen | Do. |
| 26 | Methyl | do | 1,4-naphthylene | do | do | Tetramethylammonium | Do. |
| 27 | Julolidin-8-yl | | | do | do | Sodium | Ethanol. |
| 28 | Methyl | 6-tetrahydroquinolinyl | | do | p-Carboxyphenyl | Magnesium | Do. |
| 29 | Carboxymethyl | Methyl | 1,4-phenylene | | N-methylpiperazino | Disodium | Do. |
| 30 | Methyl | do | 2-methyl-1,4-phenylene | Hydrogen | m-Carboxyphenyl | Ethylamine | Acetone. |
| 31 | do | do | 1,4-phenylene | do | 3-(5-carboxy)-triazolinyl | Sodium | Ethanol. |
| 32 | do | do | do | do | 5-nicotinyl | do | Water. |
| 33 | do | do | do | do | 2-carboxyethyl | Trimethylhydroxylammonium | Ethanol. |
| 34 | do | do | do | Benzyl | p-Carboxyphenyl | Lithium | Toluene. |
| 35 | do | do | do | Hydrogen | 3-carboxy-6-sulphatophenyl | Disodium | Do. |
| 36 | do | do | 2-methoxy-1,4-phenylene | do | o-Carboxyphenyl | Diethylammonium | Ethanol. |
| 37 | do | do | 1,4-phenylene | do | 4-carboxy-1-naphthyl | Sodium | Do. |
| 38 | do | do | do | do | 3-carboxy-1-naphthyl | do | Water. |
| 39 | do | do | do | do | p-Carboxybenzyl | do | Ethanol. |
| 40 | 4-methylcyclohexyl | do | do | do | p-Carboxyphenyl | Potassium | Do. |

References Cited

UNITED STATES PATENTS 2,755,203   7/1956   Stallman _____ 117—37

DONALD G. DAUS, Primary Examiner

R. D. McCLOUD, Assistant Examiner

U.S. Cl. X.R.

117—35.6; 260—246 B, 247.2, 268 BI, 268 PH, 283 BI, 286 R, 287 R, 288 R, 293.78, 326.3; 282—28 R